United States Patent
Beutel et al.

(10) Patent No.: US 7,875,573 B2
(45) Date of Patent: Jan. 25, 2011

(54) PT-PD DIESEL OXIDATION CATALYST WITH CO/HC LIGHT-OFF AND HC STORAGE FUNCTION

(75) Inventors: Tilman W. Beutel, Neshanic Station, NJ (US); Joseph C. Dettling, Howell, NJ (US); Dustin O. Hollobaugh, Neptune City, NJ (US); Torsten W. Mueler-Stach, Hannover (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 12/490,803

(22) Filed: Jun. 24, 2009

(65) Prior Publication Data

US 2009/0320449 A1    Dec. 31, 2009

Related U.S. Application Data

(63) Continuation of application No. 11/450,716, filed on Jun. 9, 2006, now Pat. No. 7,576,031.

(51) Int. Cl.
*B01J 23/42* (2006.01)
*B01J 23/00* (2006.01)
*B01J 23/56* (2006.01)
*B01J 23/44* (2006.01)
*B01D 53/56* (2006.01)
*B01D 53/94* (2006.01)

(52) U.S. Cl. .............. 502/339; 502/325; 502/332; 502/333; 502/334; 502/527.12; 423/213.2

(58) Field of Classification Search .......... 502/325, 502/326, 332, 333, 334, 339, 527.12; 423/212, 423/213.2, 247

See application file for complete search history.

(56) References Cited

U.S. PATENT DOCUMENTS

| | | |
|---|---|---|
| 3,904,551 A | 9/1975 | Lundsager et al. |
| 4,303,552 A | 12/1981 | Ernest et al. |
| 4,329,162 A | 5/1982 | Pitcher, Jr. |
| 4,335,023 A | 6/1982 | Dettling et al. |
| 4,340,403 A | 7/1982 | Higuchi et al. |
| 4,364,760 A | 12/1982 | Higuchi |
| 4,403,008 A | 9/1983 | Factor |
| 4,519,820 A | 5/1985 | Oyobe et al. |
| 4,559,193 A | 12/1985 | Ogawa et al. |
| 4,563,414 A | 1/1986 | Ogawa et al. |
| 4,929,581 A | 5/1990 | Steinwandel et al. |
| 4,961,917 A | 10/1990 | Byrne |

(Continued)

FOREIGN PATENT DOCUMENTS

WO    WO-2004/025093    3/2004

*Primary Examiner*—Karl E Group
*Assistant Examiner*—Noah S Wiese
(74) *Attorney, Agent, or Firm*—Scott S. Servilla; Diehl Servilla LLC; Melanie L. Brown (57) ABSTRACT

The present invention is directed to a diesel oxidation catalyst for the treatment of exhaust gas emissions, such as the oxidation of unburned hydrocarbons (HC), and carbon monoxide (CO) and the reduction of nitrogen oxides (NOx). More particularly, the present invention is directed to a novel washcoat composition comprising two distinct washcoat layers containing two distinctly different ratios of Pt:Pd.

18 Claims, 8 Drawing Sheets

U.S. PATENT DOCUMENTS

| | | | |
|---|---|---|---|
| 5,071,816 A | 12/1991 | Horiuchi et al. | |
| 5,100,632 A | 3/1992 | Dettling | |
| 5,125,231 A | 6/1992 | Patil et al. | |
| 5,491,120 A | 2/1996 | Voss et al. | |
| 5,516,497 A | 5/1996 | Speronello et al. | |
| 5,627,124 A | 5/1997 | Farrauto et al. | |
| 5,804,155 A | 9/1998 | Farrauto et al. | |
| 6,013,599 A | 1/2000 | Manson | |
| 6,066,587 A | 5/2000 | Kurokawa et al. | |
| 6,093,378 A | 7/2000 | Deeba et al. | |
| 6,153,160 A | 11/2000 | Voss et al. | |
| 6,171,556 B1 | 1/2001 | Burk et al. | |
| 6,180,558 B1 | 1/2001 | Kurokawa et al. | |
| 6,248,684 B1 | 6/2001 | Yavuz et al. | |
| 6,248,689 B1 | 6/2001 | Manson | |
| 6,255,249 B1 | 7/2001 | Voss et al. | |
| 6,274,107 B1 | 8/2001 | Yavuz et al. | |
| 6,497,848 B1 | 12/2002 | Deeba et al. | |
| 6,514,905 B1 * | 2/2003 | Hanaki et al. | 502/328 |
| 6,606,856 B1 | 8/2003 | Brown et al. | |
| 6,677,264 B1 * | 1/2004 | Klein et al. | 502/74 |
| 6,764,665 B2 | 7/2004 | Deeba et al. | |
| 6,826,906 B2 * | 12/2004 | Kakwani et al. | 60/303 |
| 2003/0059356 A1 | 3/2003 | Hoke et al. | |
| 2003/0108465 A1 | 6/2003 | Voss et al. | |
| 2003/0175192 A1 | 9/2003 | Hu et al. | |
| 2004/0001782 A1 * | 1/2004 | Kumar et al. | 422/180 |
| 2004/0209769 A1 | 10/2004 | Demel et al. | |
| 2004/0219077 A1 | 11/2004 | Voss et al. | |
| 2005/0197244 A1 | 9/2005 | L'vovich et al. | |
| 2006/0039843 A1 | 2/2006 | Patchett et al. | |

* cited by examiner

PT-PD DIESEL OXIDATION CATALYST WITH CO/HC LIGHT-OFF AND HC STORAGE FUNCTION

CROSS-REFERENCE TO RELATED APPLICATIONS

This application is a continuation of U.S. patent application Ser. No. 11/450,716, filed on Jun. 9, 2006, the entire content of which is incorporated herein by reference.

FIELD OF THE INVENTION

The present invention is directed to a Pt/Pd diesel oxidation catalyst with CO/HC light-off and HC storage functions. More specifically, the present invention is directed to a novel two-layer catalyst composition comprising a support material and a precious metal component coated on a carrier support.

BACKGROUND OF THE INVENTION

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their fuel economy, durability, and their ability to generate high torque at low speed.

From the standpoint of emissions, however, diesel engines present problems more severe than their spark-ignition counterparts. Emission problems relate to particulate matter (PM), nitrogen oxides (NOx), unburned hydrocarbons (HC) and carbon monoxide (CO). NOx is a term used to describe various chemical species of nitrogen oxides, including nitrogen monoxide (NO) and nitrogen dioxide ($NO_2$), among others. NO is of concern because it is believed to undergo a process known as photo-chemical smog formation, through a series of reactions in the presence of sunlight and hydrocarbons, and is significant contributor to acid rain. $NO_2$ on the other hand has a high potential as an oxidant and is a strong lung irritant. Particulates (PM) are also connected to respiratory problems. As engine operation modifications are made to reduce particulates and unburned hydrocarbons on diesel engines, the NOx emissions tend to increase.

The two major components of particulate matter are the volatile organic fraction (VOF) and a soot fraction (soot). The VOF condenses on the soot in layers, and is derived from the diesel fuel and oil. The VOF can exist in diesel exhaust either as a vapor or as an aerosol (fine droplets of liquid condensate) depending on the temperature of the exhaust gas. Soot is predominately composed of particles of carbon. The particulate matter from diesel exhaust is highly respirable due to its fine particle size, which poses health risks at higher exposure levels. Moreover, the VOF contains polycyclic aromatic hydrocarbons, some of which are suspected carcinogens.

A filter known in the art for trapping particulate matter is a wall-flow filter. Such wall-flow filters can comprise catalysts on the filter and burn off filtered particulate matter. A common construction is a multi-channel honeycomb structure having the ends of alternate channels on the upstream and downstream sides of the honeycomb structure plugged. This results in a checkerboard type pattern on either end. Channels plugged on the upstream or inlet end are opened on the downstream or outlet end. This permits the gas to enter the open upstream channels, flow through the porous walls and exit through the channels having open downstream ends. The gas to be treated passes into the catalytic structure through the open upstream end of a channel and is prevented from exiting by the plugged downstream end of the same channel. The gas pressure forces the gas through the porous structural walls into channels closed at the upstream end and opened at the downstream end. Such structures are primarily known to filter particles out of the exhaust gas stream. Often the structures have catalysts on the substrate, which enhance the oxidation of the particles. Typical patents disclosing such catalytic structures include U.S. Pat. Nos. 3,904,551; 4,329,162; 4,340,403; 4,364,760; 4,403,008; 4,519,820; 4,559,193; and 4,563,414.

One NOx removal technique comprises a non-thermal plasma gas treatment of NO to produce $NO_2$ which is then combined with catalytic storage reduction treatment, e.g., a lean NOx trap, to enhance NOx reduction in oxygen-rich vehicle engine exhausts. In the lean NOx trap, the $NO_2$ from the plasma treatment is adsorbed on a nitrate-forming material, such as an alkali or alkaline earth metals, and stored as a nitrate. An engine controller unit (ECU) periodically runs a brief fuel-rich condition to provide hydrocarbons for a reaction that decomposes the stored nitrate into benign $N_2$. By using a plasma, the lean NOx trap catalyst can be implemented with known NOx absorbers, and the catalyst may contain less or essentially no precious metals, such as Pt, Pd and Rh, for reduction of the nitrate to $N_2$. Accordingly, an advantage is that a method for NOx emission reduction is provided that is inexpensive and reliable. The plasma-assisted lean NOx trap can allow the life of precious metal lean NOx trap catalysts to be extended for relatively inexpensive compliance to NOx emission reduction laws. Furthermore, not only does the plasma-assisted lean NOx trap process improve the activity, durability, and temperature window of lean NOx trap catalysts, but it allows the combustion of fuels containing relatively high sulfur contents with a concomitant reduction of NOx, particularly in an oxygen-rich vehicular environment.

Another catalytic technology for removal of NOx from lean-burn engine exhausts involves NOx storage reduction catalysis, commonly called the "lean-NOx trap". The lean-NOx trap technology can involve the catalytic oxidation of NO to $NO_2$ by catalytic metal components effective for such oxidation, such as precious metals. However, in the lean NOx trap, the formation of $NO_2$ is followed by the formation of a nitrate when the $NO_2$ is adsorbed onto the catalyst surface. The $NO_2$ is thus "trapped", i.e., stored, on the catalyst surface in the nitrate form and subsequently decomposed by periodically operating the system under fuel-rich combustion conditions that effect a reduction of the released NOx (nitrate) to $N_2$.

Oxidation catalysts comprising a precious metal dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), or more simply catalytic converters, which are placed in the exhaust flow path from a Diesel-powered engine to treat the exhaust before it vents to the atmosphere. Typically, the diesel oxidation catalysts are formed on ceramic or metallic substrate carriers (such as the flow-through monolith carrier, as described hereinbelow) upon which one or more catalyst coating compositions are deposited. In addition to the conversions of gaseous HC, CO and the SOF fraction of particulate matter, oxidation catalysts that contain platinum group metals (which are typically dispersed on a refractory oxide support) promote the oxidation of nitric oxide (NO) to $NO_2$.

U.S. Pat. No. 5,491,120 discloses oxidation catalysts containing ceria and a bulk second metal oxide which may be one or more of titania, zirconia, ceria-zirconia, silica, alumina-silica and alpha-alumina.

U.S. Pat. No. 5,627,124 discloses oxidation catalysts containing ceria and alumina. It is disclosed that each have a surface area of at least about 10 $m^2/g$. The weight ratio of ceria to alumina is disclosed to be 1.5:1 to 1:1.5. It is further disclosed to optionally include platinum. The alumina is disclosed to preferably be activated alumina. U.S. Pat. No. 5,491,120 discloses oxidation catalysts containing ceria and a bulk second metal oxide, which may be one or more of titania, zirconia, ceria-zirconia, silica, alumina-silica and alpha-alumina.

The prior art also shows an awareness of the use of zeolites, including metal-doped zeolites, to treat diesel exhaust. For example, U.S. Pat. No. 4,929,581 discloses a filter for diesel exhaust, in which the exhaust is constrained to flow through the catalyst walls to filter the soot particles. A catalyst comprising a platinum group metal-doped zeolite is dispersed on the walls of the filter to catalyze oxidation of the soot to unplug the filter.

As is well-known in the art, catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, it is known in the art to include an adsorbent material, which may be a zeolite, as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature. In this regard, see for example U.S. Pat. No. 5,125,231 which discloses (columns 5-6) the use of platinum group metal-doped zeolites as low temperature hydrocarbon adsorbents as well as oxidation catalysts.

As discussed hereinabove, oxidation catalysts comprising a platinum group metal dispersed on a refractory metal oxide support are known for use in treating exhaust gas emissions from diesel engines. Platinum (Pt) remains the most effective platinum group metal for oxidizing CO and HC in a DOC, after high temperature aging under lean conditions and in the presence of fuel sulfur. Nevertheless, one of the major advantages of using Pd based catalysts is the lower cost of Pd compared to Pt. However, Pd based DOCs typically show higher light-off temperatures for oxidation of CO and HC, especially when used with HC storage materials, potentially causing a delay in HC and or CO light-off. Pd containing DOCs may poison the activity of Pt to convert paraffins and/or oxidize NO and may also make the catalyst more susceptible to sulfur poisoning. These characteristics have typically prevented the use of Pd as an oxidation catalyst in lean burn operations especially for light duty diesel applications where engine temperatures remain below 250° C. for most driving conditions.

The present invention conceives of a novel washcoat design in order to improve the before mentioned disadvantages.

SUMMARY OF THE INVENTION

The present invention is directed to a diesel oxidation catalyst for the treatment of exhaust gas emissions, such as the oxidation of unburned hydrocarbons (HC), and carbon monoxide (CO) and the reduction of nitrogen oxides (NOx). More particularly, the present invention is directed to a novel washcoat composition comprising two distinct washcoat layers containing two distinctly different weight ratios of Pt:Pd.

In another embodiment, the present invention is directed to a method of treating an exhaust gas stream by contacting the exhaust gas stream with a diesel oxidation catalyst containing a novel washcoat composition comprising two distinct washcoat layers containing two distinctly different ratios of Pt:Pd.

DETAILED DESCRIPTION OF THE INVENTION

The present invention is directed to a novel diesel oxidation catalyst (DOC) washcoat composition comprising two distinct washcoat layers. The washcoat composition of the present invention is optimized for sulfur tolerance and paraffin oxidation in the first or top washcoat layer and for hydrothermal stability in the second or bottom washcoat layer. The first or top washcoat layer comprises a high-surface area support material, one or more hydrocarbon storage components, and a precious metal catalyst containing platinum (Pt) and palladium (Pd). The second or bottom washcoat layer comprises a high-surface area support material and a precious metal catalyst containing platinum (Pt) and palladium (Pd), wherein the support is a substantially silica free support material and does not contain a hydrocarbon storage component.

The present invention is also directed to a method for treating diesel engine exhaust gas stream emissions containing unburned hydrocarbons (HC) and carbon monoxides (CO). An exhaust gas stream from a diesel engine can be treated in an emission treatment device containing the novel washcoat composition of the present invention. In accordance with the present invention, the exhaust gas stream first comes into contact with the first or top washcoat layer and subsequently comes into contact with the second or bottom washcoat layer.

In accordance with the present invention, two layers with two distinctly different ratios of Pt:Pd are employed wherein the Pt:Pd weight ratio in a first layer (the first or top washcoat layer) is greater than the Pt:Pd weight ratio of a second layer (the second or bottom washcoat layer) (hereinafter "Pt:Pd ratio" refers to a Pt:Pd weight ratio). For example, the first or top washcoat layer may contain a Pt:Pd weight ratio of at least 2:1. Pt:Pd ratios from at least about 2:1 to about 10:1, from about 3:1 to about 5:1, or from about 3:1 to about 4:1, are also exemplified. It is important to use a high amount of Pt in the first or top washcoat layer in order to boost sulfur tolerance while maintaining some stabilization of the metal phase against sintering. The first or top washcoat layer contains a hydrocarbon (HC) storage component, e.g., a zeolite, in order to store HCs during the cold start period of the drive cycle. After warm-up of the catalyst, the hydrocarbon (HC) storage component will release the stored HCs which are subsequently converted over the catalyst. It is important that the hydrocarbon (HC) storage component (e.g., zeolite) be incorporated into the layer with the higher Pt:Pd ratio in order to ensure an efficient conversion of released paraffins. The preparation of the first or top washcoat layer avoids acetate, in the form of precursors or free acid, in order to achieve better fixation of Pt and Pd in the top washcoat and to minimize the resolubilization of Pd in the bottom washcoat during coating, and thus, potential migration of Pd from the bottom washcoat into the top washcoat during the drying process. Soluble Pd and Pt which are mobile in the aqueous phase of the slurry might migrate during the drying process and lead to an accumulation of precious metals at the surface of the washcoat and at the front end and rear end of the catalyst. Instead of acetic acid, a small amount of tartaric acid may be used in the top washcoat to fix the precious metals (e.g., Pt and/or Pd) on the support. The use of tartaric acid helps in the achievement of separate washcoat layers with different Pt:Pd ratios.

The second or bottom layer contains a lower Pt:Pd ratio to replace a maximum of the Pt with Pd for maximum cost saving reasons. The second or bottom washcoat layer has a Pt:Pd ratio of less than about 2:1. Also, exemplified are Pt:Pd ratios of from less than about 2:1 to about 1:2, or from less than about 2:1 to about 1.4:1 (7:5). However, a minimum ratio of 1.4:1 (7:5) is preferred in order to guarantee sufficient CO/olefin light-off activity after thermal aging. The support used in the second or bottom washcoat layer is a silica-free support (e.g., alumina or blend of aluminas) in order to prevent silica interference with Pd. The bottom layer does not contain any HC storage materials (e.g., a zeolite) in order to prevent the storage and release of paraffins during a light-off protocol. Released paraffins cannot be converted efficiently when the Pd content in the catalyst is greater than 30 wt % of the total precious metal weight. In one embodiment, lanthanum oxide (e.g., $La_2O_3$) as a promoter may be used in the second or bottom coat to boost high temperature stability. The use of small amounts of zirconium oxide (e.g., $ZrO_2$) in order to stabilize the precious metal against sintering may be used in both the bottom and top washcoat layers.

Preferably, the novel oxidation catalyst washcoat composition of the present invention is disposed on a substrate. The substrate may be any of those materials typically used for preparing catalysts, and will preferably comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to herein as flow-through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc.

Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Flow-through substrates typically have a wall thickness between 0.002 and 0.1 inches. Preferred flow-through substrates have a wall thickness of between 0.002 and 0.015 inches.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The substrates useful for the catalysts of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the adherence of the refractory metal oxide support and catalytically promoting metal components to the substrate.

The oxidation catalyst washcoat compositions of the present invention can be applied to the substrate surfaces by any known means in the art. For example, the catalyst washcoat can be applied by spray coating, powder coating, or brushing or dipping a surface into the catalyst composition.

Useful high-surface area supports include one or more refractory oxides. These oxides include, for example, silica and alumina, titania and zirconia include mixed oxide forms such as silica-alumina, aluminosilicates which may be amorphous or crystalline, alumina-zirconia, alumina-ceria and the like and titanium-alumina and zirconium-silicate. In one embodiment, the support is preferably comprised of alumina which preferably includes the members of the gamma, delta, theta or transitional aluminas, such as gamma and eta aluminas, and, if present, a minor amount of other refractory oxide, e.g., about up to 20 weight percent. Desirably, the active alumina has a specific surface area of 60 to 350 $m^2/g$, and typically 90 to 250 m²/g. The loading on the refractory oxide support is preferably from about 0.5 to about 6 g/in³, more preferably from about 2 to about 5 g/in³ and most preferably from about 3 to about 4 g/in³.

The high-surface area support material of the first or top washcoat layer is preferably a refractory oxide material which is selected from the group including compounds of silica, alumina, zirconia, titania and mixtures thereof. Particularly preferred supports are activated, high-surface area compounds selected from the group consisting of alumina, silica, titania, zirconia, silica-alumina, alumina-zirconia, alumina-chromia, alumina-ceria zirconium-silicate and titania-alumina.

The support used in the second or bottom washcoat layer is a substantially silica-free high-surface area support (e.g., alumina or blend of aluminas) in order to prevent silica poisoning of the Pd. As used herein, a "substantially silica-free high-surface area support" is a support material containing no more than 10 wt % silica or is completely free of silica. In one embodiment, the silica free high-surface area support is selected from the group including compounds of alumina, zirconia, titania and mixtures thereof.

As previously discussed, the catalyst composition of the present invention comprises two layers in which two distinctly different ratios of platinum (Pt) to palladium (Pd) (Pt:Pd) are employed. The first or top washcoat layer contains a Pt:Pd weight ratio of at least about 2:1 and the second or bottom washcoat layer contains a Pt:Pd weight ratio of less than about 2:1. The total precious metal component loading based on grams of precious metal per volume of monolith is from 5 to 500 g/ft³, preferably 15 to 250 g/ft³, preferably from 10 to 150 g/ft³.

Optionally, the first or top washcoat layer of the present invention may contain one or more hydrocarbon (HC) storage component for the adsorption of hydrocarbons (HC). Typically, any known hydrocarbon storage material can be used, e.g., a micro-porous material such as a zeolite or zeolite-like material. Preferably, the hydrocarbon storage material is a zeolite. The zeolite can be a natural or synthetic zeolite such as faujasite, chabazite, clinoptilolite, mordenite, silicalite, zeolite X, zeolite Y, ultrastable zeolite Y, ZSM-5 zeolite, offretite, or a beta zeolite. Preferred zeolite adsorbent materials have a high silica to alumina ratio. The zeolites may have a silica/alumina molar ratio of from at least about 25/1, preferably at least about 50/1, with useful ranges of from about 25/1 to 1000/1, 50/1 to 500/1 as well as about 25/1 to 300/1, from about 100/1 to 250/1, or alternatively from about 35/1 to 180/1 is also exemplified. Preferred zeolites include ZSM, Y and beta zeolites. A particularly preferred adsorbent may comprises a beta zeolite of the type disclosed in U.S. Pat. No. 6,171,556 incorporated herein by reference in its entirety. The zeolite loading should not be smaller than 0.3 g/in³ in order to guarantee sufficient HC storage capacity and to prevent a premature release of stored paraffins during the temperature ramp following a low temperature storage. Preferably, zeolite content is in the range of 0.4-0.7 g/in³. Higher zeolite loadings than 1.0 g/in³ may lead to premature release of stored toluene if present in the feed. A premature release of aromatics and paraffins from the zeolite may cause a delay in the CO and HC light-off.

In one embodiment, the one or more zeolites may be stabilized by ion exchange with a rare earth metal. In another embodiment, the washcoat layer(s) of the present invention may include one or more rare earth oxides (e.g., ceria) to promote the oxidation of heavy HCs.

In one embodiment, the washcoat composition of the present invention comprises two distinct washcoat layers coated on a single substrate or carrier member, one layer (e.g., the first or top washcoat layer) over top of the other (e.g., the second or bottom washcoat layer). In this embodiment, the second or bottom washcoat layer is coated over the entire axial length of a substrate (e.g., a flow-through monolith) and the first or top washcoat layer is coated over the entire axial length of the second or bottom washcoat layer. In accordance with the present invention, the first or top washcoat layer comprises a high-surface area support material, one or more zeolites, and a precious metal catalyst containing platinum (Pt) and palladium (Pd) in a Pt:Pd ratio of at least about 2:1. The second or bottom layer comprises a high-surface area support material and a precious metal catalyst containing platinum (Pt) and palladium (Pd) in a Pt:Pd ratio of less than about 2:1, wherein said support is a silica-free support material, and wherein said first washcoat layer does not contain a hydrocarbon storage component. The complete absence of silica in the support prevents silica inhibition of Pd. Released paraffins are not converted efficiently when the Pt:Pd ratio is below 2:1, and as such the second or bottom washcoat does not contain a HC storage component, which prevents the storage and release of paraffins during a light-off period.

Figure 1:
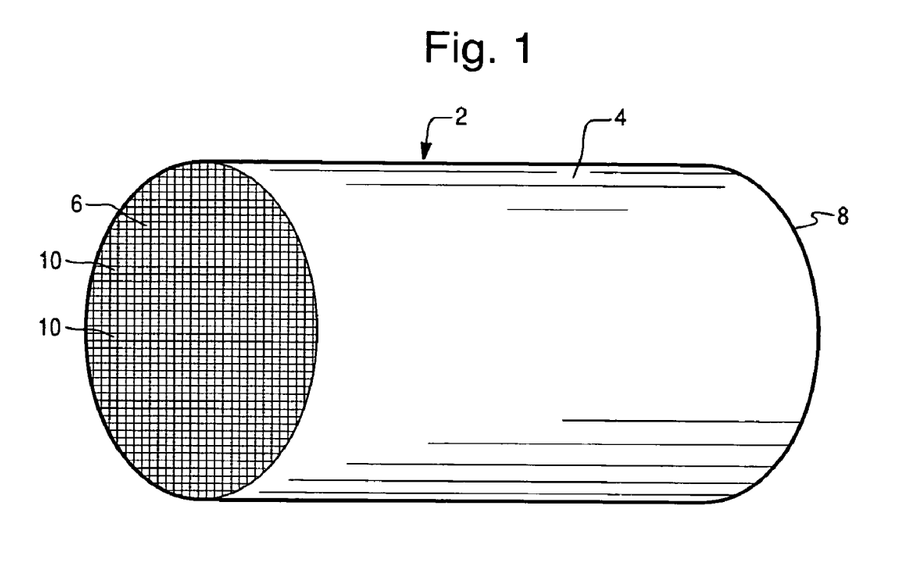
FIG. 1 is a perspective view of a honeycomb-type refractory carrier member which may comprise a novel diesel oxidation catalyst (DOC) washcoat composition in accordance with the present invention.
Figure 2:
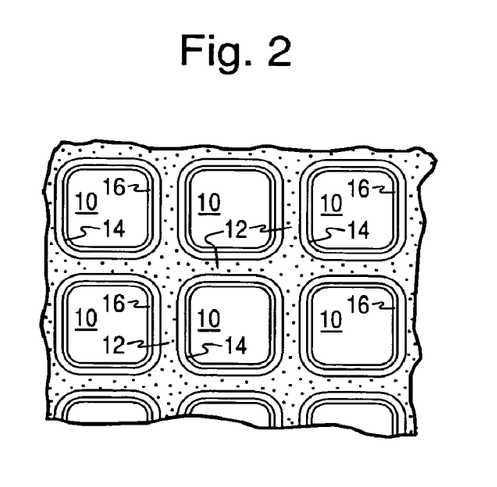
FIG. 2 is a partial cross-sectional view enlarged relative to FIG. 1 and taken along a plane parallel to the end faces of the carrier of FIG. 1, which shows an enlarged view of one of the gas flow passages shown in FIG. 1.

The washcoat composition of this embodiment may be more readily appreciated by reference to FIGS. 1 and 2. FIGS. 1 and 2 show a refractory carrier member 2, in accordance with one embodiment of present invention. Referring to FIG. 1, the refractory carrier member 2 is a cylindrical shape having a cylindrical outer surface 4, an upstream end face 6 and a downstream end face 8, which is identical to end face 6. Carrier member 2 has a plurality of fine, parallel gas flow passages 10 formed therein. As seen in FIG. 2 flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2 walls 12 are so dimensioned and configured that gas flow passages 10 have a substantially regular polygonal shape, substantially square in the illustrated embodiment, but with rounded corners in accordance with U.S. Pat. No. 4,335,023, issued Jun. 15, 1982 to J. C. Dettling et al. A discrete bottom layer 14, which in the art and sometimes below is referred to as a "washcoat", is adhered or coated onto the walls 12 of the carrier member. As shown in FIG. 2, a second discrete top washcoat layer 16 is coated over the bottom washcoat layer 14. In accordance with the present invention, the top washcoat layer 16 comprises a high-surface area support material, one or more zeolites, and a precious metal catalyst containing platinum (Pt) and palladium (Pd) in a Pt:Pd ratio of at least about 2:1. The bottom washcoat layer 16 comprises a high-surface area support material and a precious metal catalyst containing platinum (Pt) and palladium (Pd) in a Pt:Pd ratio of less than about 2:1, wherein said support is a silica free support material, and wherein said first washcoat layer does not contain a hydrocarbon storage component.

As shown in FIG. 2, the carrier member include void spaces provided by the gas-flow passages 10, and the cross-sectional area of these passages 10 and the thickness of the walls 12 defining the passages will vary from one type of carrier member to another. Similarly, the weight of washcoat applied to such carriers will vary from case to case. Consequently, in describing the quantity of washcoat or catalytic metal component or other component of the composition, it is convenient to use units of weight of component per unit volume of catalyst carrier. Therefore, the units grams per cubic inch ("g/in³") and grams per cubic foot ("g/ft³") are used herein to mean the weight of a component per volume of the carrier member, including the volume of void spaces of the carrier member.

During operation, exhaust gaseous emissions from a lean burn engine comprising hydrocarbons, carbon monoxide, nitrogen oxides, and sulfur oxides initially encounter the top washcoat layer 16, and thereafter encounter the bottom washcoat layer 14.

In another embodiment, the distinct washcoat layers of the present invention may be zone coated such that one washcoat layer is on the upstream end, and the other washcoat on the downstream end, of the carrier substrate. For example, an upstream washcoat layer can be coated over a portion of the upstream region of the substrate and a downstream washcoat layer can be coated over a downstream portion of the substrate. In this embodiment, the top washcoat layer of the present invention is coated over the upstream potion of the carrier substrate (i.e., the upstream washcoat layer) and the bottom washcoat layer is coated over a downstream portion of the carrier substrate (i.e., the downstream washcoat layer). The upstream washcoat layer comprises a high-surface area support material, one or more zeolites, and a precious metal catalyst containing platinum (Pt) and palladium (Pd) in a Pt:Pd ratio of at least about 2:1. The second or bottom washcoat layer comprises a high-surface area support material and a precious metal catalyst containing platinum (Pt) and palladium (Pd) in a Pt:Pd ratio of less than about 2:1. In accordance with the present invention it is essential that the downstream washcoat layer does not contain a silica support material, and does not contain a hydrocarbon storage component. The complete absence of silica in the support prevents silica poisoning of Pd. Released paraffins are not converted efficiently when the Pd content is higher than 30 wt %, and as such the second or bottom washcoat does not contain a HC storage component, which prevents the storage and release of paraffins during a light-off period.

Figure 3:
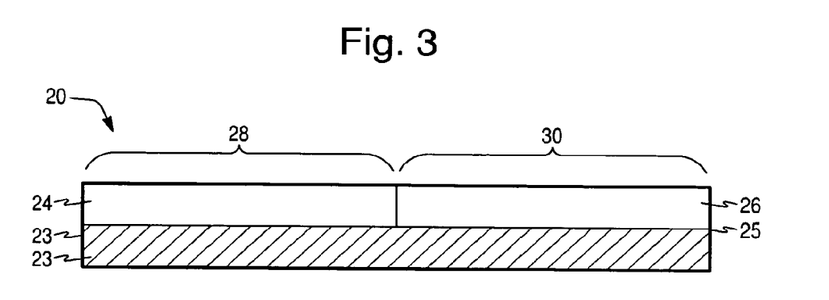
FIG. 3 is a schematic view showing an alternative configuration of diesel oxidation catalyst (DOC) washcoat composition, in accordance with one embodiment of the present invention.

The catalyst composition of this embodiment may be more easily understood by reference to FIG. 3. As shown in FIG. 3 a diesel oxidation catalyst 20 is coated with a novel washcoat composition comprising a carrier member or substrate 22, for example a honeycomb monolith, which contains two separate zone coated washcoated layers, an upstream washcoat layer 24 and a downstream washcoat layer 26. The upstream layer 24 contains a high-surface area support material, one or more zeolites, and a precious metal catalyst containing platinum (Pt) and palladium (Pd) in a Pt:Pd ratio of at least about 2:1. The downstream washcoat layer 26 may contain a high-surface area support material and a precious metal catalyst containing platinum (Pt) and palladium (Pd) in a Pt:Pd ratio of less than about 2:1. In accordance with the present invention it is essential that the downstream washcoat layer does not contain a silica support material, and does not contain a hydrocarbon storage component. Both the upstream washcoat layer 24 and downstream washcoat layer 26, respectively, generally contain a precious metal loading of from about 5 to 500 g/ft$^3$. Loadings of precious metal from 25 to 250 g/ft$^3$ and 60 to 150 g/ft$^3$ are also exemplified.

In this embodiment, the upstream 24 and downstream 26 washcoat layers, respectively, are each zone coated only over a portion of the substrate 23. A typical substrate being from about 3 to about 10 inches in length, substrates having a length of about 5 inches or about 7 inches are also exemplified. However, the combination of the upstream 24 and downstream 26 washcoat layers, respectively, cover the entire length of the substrate 23. The upstream washcoat layer 24 can be coated over at least 0.5 inch, and up to 5 inches, of the upstream portion of the substrate 23. An upstream washcoat layer 24 having a length of at least about 1.0 inch, and up to 3.5 inches, or from at least 1.5 inches and up to 2.5 inches, from the upstream edge of the catalytic member, are also exemplified. With the downstream washcoat portion 26 covering the remaining downstream portion of the substrate 23.

The length of the upstream washcoat layer 24 can also be described as a percentage of the length of the catalytic member from the upstream to downstream edge. Typically, the upstream washcoat layer 24 will comprise from about 5 to about 70% of the upstream length of the catalytic member. Also exemplified is an upstream washcoat layer 24 of up to about 20%, up to about 40%, and up to about 60% of the upstream length of the diesel oxidation catalyst 20. With the downstream washcoat portion 26 covering the remaining downstream portion of the substrate 22. Thus, the downstream washcoat portion 26 may comprise 95% to about 30% of the downstream portion 30 of the substrate 23.

During operation, exhaust gases flow through the diesel oxidation catalyst 20 from the upstream edge 25 to the downstream edge 27. The precious metal catalysts contained in both the upstream 24 and downstream 26 washcoat layers, respectively, oxidize HC and CO pollutants contained in the exhaust gases.

The diesel oxidation catalyst (DOC) of the present invention can be used in an integrated emission treatment system comprising one or more additional components for the treatment of diesel exhaust gas emissions. For example, the emission treatment system may further comprise a soot filter component and/or a selective catalytic reduction (SCR) component. The diesel oxidation catalyst can be located upstream or downstream from the soot filter and/or selective catalytic reduction component.

In addition to treating the exhaust gas emissions via use of an oxidation catalyst the present invention may employ a soot filter for removal of particulate matter. The soot filter may be located upstream or downstream from the DOC, but is preferably located downstream from the diesel oxidation catalyst. In a preferred embodiment, the soot filter is a catalyzed soot filter (CSF). The CSF of the present invention comprises a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with a one or more high surface area refractory oxides (e.g., alumina, silica, silica alumina, zirconia, and zirconia alumina) and/or an oxidation catalyst (e.g., a ceria-zirconia) for the combustion of unburned hydrocarbons and to some degree particulate matter. However, preferably the soot burning catalyst is an oxidation catalyst comprising one or more precious metal (PM) catalysts (platinum, palladium, and/or rhodium).

In general, any known filter substrate in the art can be used, including, e.g., a honeycomb wall flow filter, wound or packed fiber filter, open-cell foam, sintered metal filter, etc., with wall flow filters being preferred. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Preferred wall flow substrates have a wall thickness of between 0.002 and 0.015 inches.

Preferred wall flow filter substrates are composed of ceramic-like materials such as cordierite, α-alumina, silicon carbide, silicon nitride, zirconia, mullite, spodumene, alumina-silica-magnesia or zirconium silicate, or of porous, refractory metal. Wall flow substrates may also be formed of ceramic fiber composite materials. Preferred wall flow substrates are formed from cordierite, silicon carbide and aluminum titanate. Such materials are able to withstand the environment, particularly high temperatures, encountered in treating the exhaust streams.

Preferred wall flow substrates for use in the inventive system include thin porous walled honeycombs (monolith)s through which the fluid stream passes without causing too great an increase in back pressure or pressure across the article. Normally, the presence of a clean wall flow article will create a back pressure of 1 inch water column to 10 psig. Ceramic wall flow substrates used in the system are preferably formed of a material having a porosity of at least 40% (e.g., from 40 to 70%) having a mean pore size of at least 5 microns (e.g., from 5 to 30 microns). More preferably, the substrates have a porosity of at least 50% and have a mean pore size of at least 10 microns. When substrates with these porosities and these mean pore sizes are coated with the techniques described below, adequate levels of the CSF catalyst compositions can be loaded onto the substrates to achieve excellent NOx conversion efficiency and burning off of soot. These substrates are still able to retain adequate exhaust flow characteristics, i.e., acceptable back pressures, despite the CSF catalyst loading. U.S. Pat. No. 4,329,162 is herein incorporated by reference with respect to the disclosure of suitable wall flow substrates.

The porous wall flow filter used in this invention is optionally catalyzed in that the wall of said element has thereon or contained therein one or more catalytic materials, such CSF catalyst compositions are described hereinabove. Catalytic materials may be present on the inlet side of the element wall alone, the outlet side alone, both the inlet and outlet sides, or the wall itself may consist all, or in part, of the catalytic material. In another embodiment, this invention may include the use of one or more washcoat layers of catalytic materials and combinations of one or more washcoat layers of catalytic materials on the inlet and/or outlet walls of the element.

The exhaust gas treatment system of the present invention may further comprise a selective catalytic reduction (SCR) component. The SCR component may be located upstream or downstream of the DOC and/or soot filter. Preferably, the SCR component is located downstream of a soot filter component. A suitable SCR catalyst component for use in the emission treatment system is able to effectively catalyze the reduction of the NOx component at temperatures below 600° C., so that adequate NOx levels can be treated even under conditions of low load which typically are associated with lower exhaust temperatures. Preferably, the catalyst article is capable of converting at least 50% of the NOx component to $N_2$, depending on the amount of reductant added to the system. Another desirable attribute for the composition is that it possesses the ability to catalyze the reaction of $O_2$ with any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. No. 4,961,917 (the '917 patent) and U.S. Pat. No. 5,516,497, which are both hereby incorporated by reference in their entirety. Compositions disclosed in the '917 patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of NOx with $NH_3$ to $N_2$, the disclosed compositions can also promote the oxidation of excess $NH_3$ with $O_2$, especially for those compositions having higher promoter concentrations.

Figure 4:
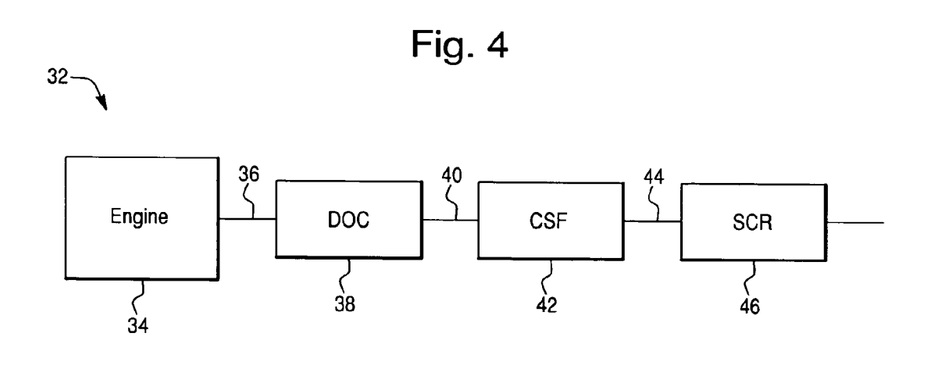
FIG. 4 is a schematic of an engine emission treatment system, in accordance with one embodiment of the present invention.

In one embodiment, the present invention is directed to an emission treatment system comprising one or more additional components for the treatment of diesel exhaust gas emissions. An exemplified emission treatment system may be more readily appreciated by reference to FIG. 4, which depicts a schematic representation of an emission treatment system 32, in accordance with this embodiment of the present invention. Referring to FIG. 4, an exhaust gas stream containing gaseous pollutants (e.g., unburned hydrocarbons, carbon monoxide and NOx) and particulate matter is conveyed via line 36 from an engine 34 to a diesel oxidation catalyst (DOC) 38, which is coated with the novel washcoat composition of the present invention. In the DOC 38, unburned gaseous and non-volatile hydrocarbons (i.e., the VOF) and carbon monoxide are largely combusted to form carbon dioxide and water. In addition, a proportion of the NO of the NOx component may be oxidized to $NO_2$ in the DOC. The exhaust stream is next conveyed via line 40 to a catalyzed soot filter (CSF) 42, which traps particulate matter present within the exhaust gas stream. The CSF 42 is optionally catalyzed for passive regeneration. After removal of particulate matter, via CSF 42, the exhaust gas stream is conveyed via line 44 to a downstream selective catalytic reduction (SCR) component 16 for the treatment and/or conversion of NOx.

EXAMPLES

Example 1

Washcoat Composition A

A top washcoat, containing 1.5 g/in³ of 1.5 wt % silica alumina having a surface area of 100 m²/g as a precious metal support and Pt and Pd in a 2:1 ratio (73.3 g/ft³ Pt and 36.67 g/ft³ Pd), was coated onto a carrier substrate. A small amount of $ZrO_2$ was implemented as a blend of Zr—OH (0.05 g/in³) and Zr—N (0.005 g/in³). Acetic acid or acetate precursors were strictly avoided in the top washcoat so as to avoid resolubilization of the Pd and part of the Pt in the bottom and top washcoats. A small amount of tartaric acid was used in the top washcoat to fix precious group metals on the support.

Example 2

Washcoat Composition B

A top washcoat, containing 1.5 g³/in silica alumina having a surface area of 100 m²/g as a precious metal support and Pt and Pd in a 2:1 ratio (73.3 g/ft³ Pt and 36.67 g/ft³ Pd), was coated onto a carrier substrate. A medium loading (0.4 g/in³) of zeolite H-Beta (spray dried) was used in the top washcoat. A small amount of $ZrO_2$ was implemented as a blend of Zr—OH (0.05 g/in³) and Zr—N (0.005 g/in³). Acetic acid or acetate precursors were strictly avoided in the top washcoat so as to avoid resolubilization of the Pd and part of the Pt in the bottom and top washcoats. A small amount of tartaric acid was used in the top washcoat to fix precious group metals on the support.

Example 3

CO/HC Light-Off Testing

Washcoat compositions A and B were tested for CO light-off and for HC conversion. The gas composition used for determining light-off temperatures comprised 1500 ppm CO, 100 ppm NO, 14% $O_2$, 4% $CO_2$, 4% $H_2O$ with the balance being $N_2$. The gas also comprised 120 ppm Cl as propene, 80 ppm as toluene, 200 ppm Cl as decane and 30 ppm as methane. The gas was run over washcoat compositions C-G at a temperature ramp of 20° C./min and a space velocity of 55 k/h. HC conversion as a percentage was calculated from the gas exiting the catalyst.

Figure 5:
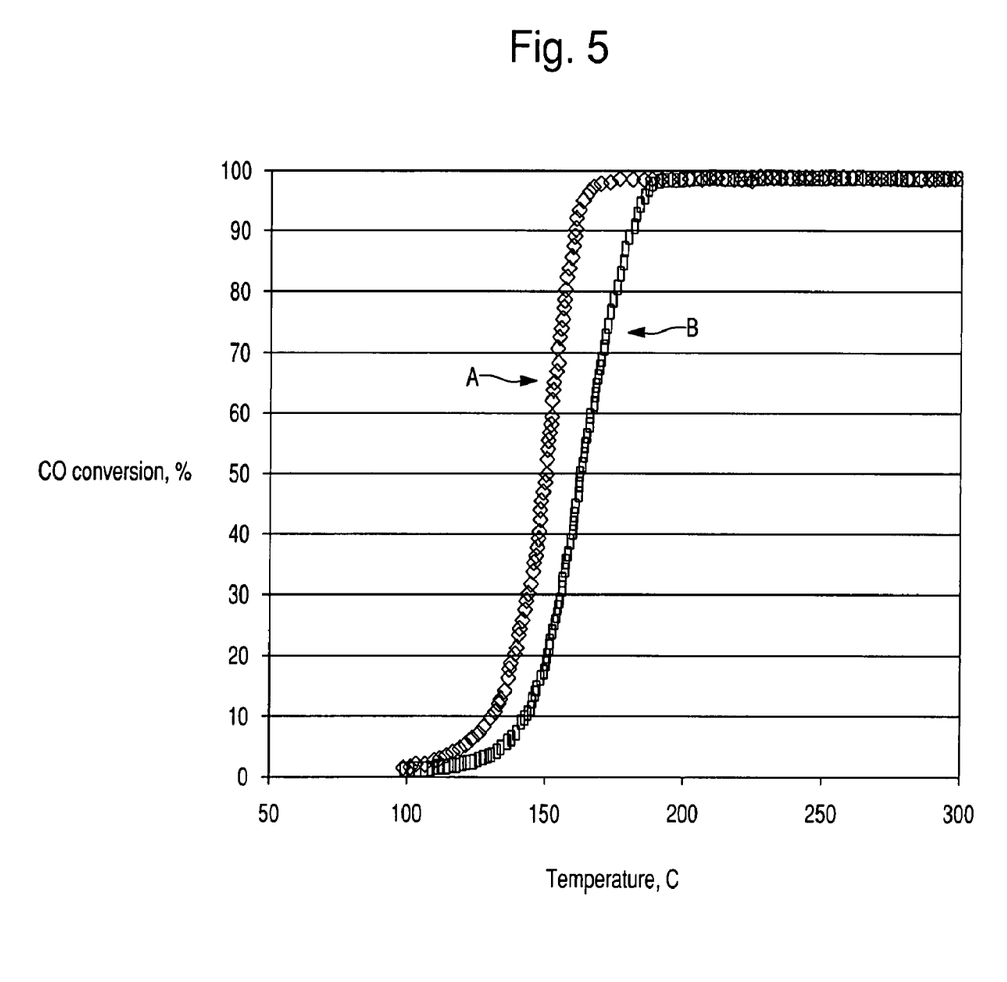
FIG. 5 shows a comparison of CO light-off after 5 hour aging at 800° C. between various washcoat compositions.
Figure 6:
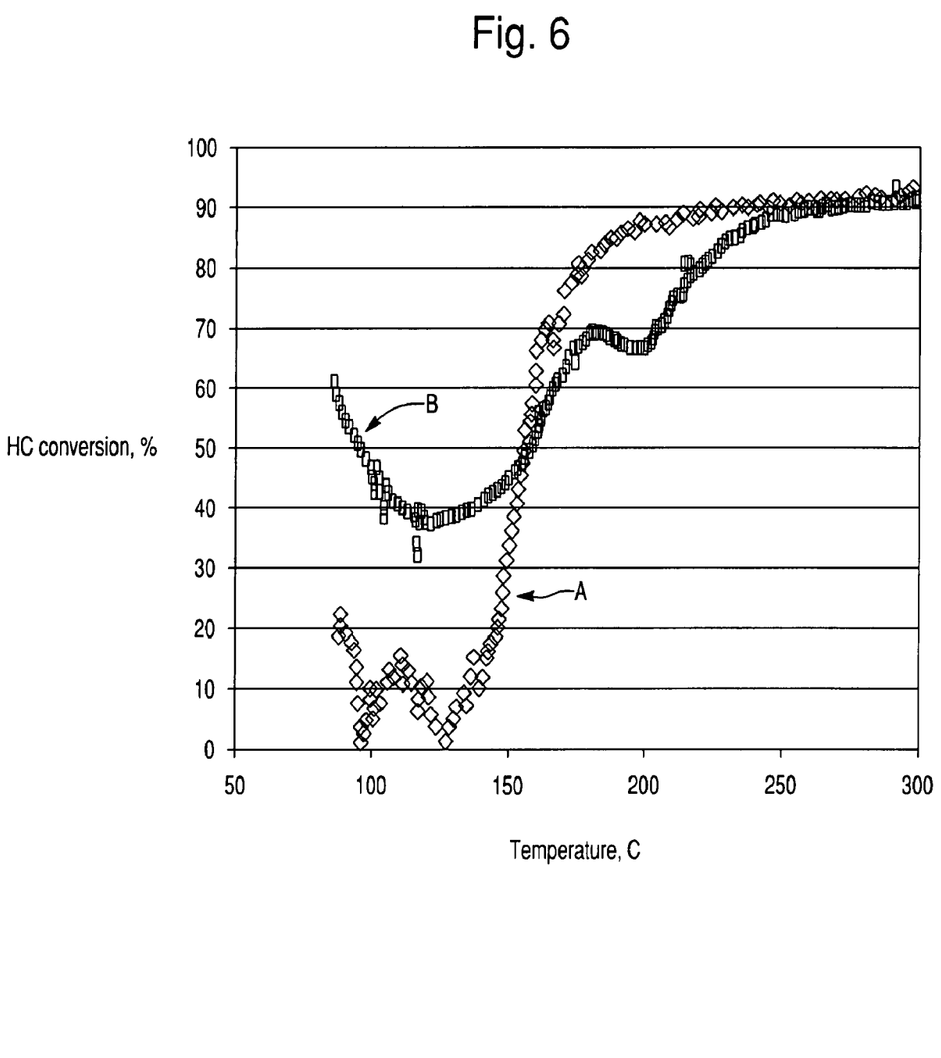
FIG. 6 shows a comparison of HC light-off after 5 hour aging at 800° C. between various washcoat compositions.

CO/HC light-off temperatures were determined for washcoat compositions A and B after aging at 800° C. for 5 hours (FIGS. 5 and 6). As can be seen from FIG. 5 washcoat composition B, which contained no zeolite, had a lower CO light-off than washcoat composition A. The HC light-off temperature was also lowered in washcoat composition B when compared to washcoat composition A (see FIG. 6).

Example 4

Washcoat Composition C (Comparative)

A bottom washcoat, containing 1.5 g/in$^3$ silica alumina having a surface area of 100 m$^2$/g, 0.5 g/in$^3$ zeolite H-Beta and 0.1 g/in$^3$ $ZrO_2$ (as acetate), was coated onto a carrier substrate. The bottom washcoat layer did not contain any precious metals.

A top washcoat, containing 1.5 g/in silica alumina having a surface area of 100 m$^2$/g as a precious metal support, 0.5 g/in$^3$ zeolite H-Beta and 110 g/ft$^3$ of Pt, was coated over the bottom washcoat. 0.05 g/in$^3$ of $ZrO_2$ (as acetate) was used as a binder and to stabilize the PM phase against sintering.

Example 5

Washcoat Composition D (Comparative)

A bottom washcoat, containing 1.5 g/in$^3$ silica alumina having a surface area of 100 m$^2$/g, 0.5 g/in$^3$ zeolite H-Beta and 0.1 g/in$^3$ $ZrO_2$ (as acetate), was coated onto a carrier substrate. The bottom washcoat layer did not contain any precious metals.

A top washcoat, containing 1.5 g/in$^3$ silica alumina having a surface area of 100 m$^2$/g as a precious metal support, 0.5 g/in$^3$ zeolite H-Beta and Pt and Pd in a 2:1 ratio (73.3 g/ft$^3$ Pt and 36.7 g/ft$^3$ Pd), was coated over the bottom washcoat. 0.05 g/in$^3$ of $ZrO_2$ (as acetate) was used as a binder and to stabilize the PM phase against sintering.

Example 6

Washcoat Composition E

A bottom washcoat, containing 0.75 g/in$^3$ of a large pore gamma alumina having a surface area of 200 m$^2$/g, 0.75 g/in$^3$ of 70 m$^2$/g delta theta alumina and Pt and Pd in a 1.4:1 ratio (32.1 g/ft$^3$ of Pt and 23.9 g/ft$^3$ Pd), was coated onto a carrier substrate. 0.05 g/in$^3$ of $ZrO_2$ (as acetate) was used as a binder and to stabilize the PM phase against sintering. No zeolite or any other siliceous material was used in the bottom coat.

A top washcoat, containing 1.3 g/in silica alumina having a surface area of 100 m$^2$/g as a precious metal support and Pt and Pd in a 3:1 ratio (41.3 g/ft$^3$ Pt and 13.8 g/ft$^3$ Pd), was coated over the bottom washcoat. A medium loading (0.4 g/in$^3$) of zeolite H-Beta (spray dried) was used in the top washcoat. A small amount of $ZrO_2$ was implemented as a blend of Zr—OH (0.05 g/in$^3$) and Zr—N (0.005 g/in$^3$). Acetic acid or acetate precursors were strictly avoided in the top washcoat so as to avoid resolubilization of the Pd and part of the Pt in the bottom and top washcoats. A small amount of tartaric acid was used in the top washcoat to fix precious group metals on the support.

Example 7

Washcoat Composition F

A bottom washcoat, containing 0.75 g/in$^3$ of a large pore $La_2O_3$ doped gamma alumina having a surface area of 200 m$^2$/g, 0.75 g/in$^3$ of 70 m$^2$/g delta theta alumina and Pt and Pd in a 1.4:1 ratio (32.1 g/ft$^3$ of Pt and 23.9 g/ft$^3$ Pd), was coated onto a carrier substrate. The PM supported on the alumina was coated onto a carrier substrate. 0.05 g/in$^3$ of $ZrO_2$ (as acetate) was used as a binder and to stabilize the PM phase against sintering. No zeolite or any other siliceous material was used in the bottom coat.

A top washcoat, containing 1.3 g/in$^3$ silica alumina having a surface area of 100 m$^2$/g as a precious metal support and Pt and Pd in a 3:1 ratio (41.3 g/ft$^3$ Pt and 13.8 g/ft$^3$ Pd), was coated over the bottom washcoat. A medium loading (0.4 g/in$^3$) of zeolite H-Beta (spray dried) was used in the top washcoat. A small amount of $ZrO_2$ was implemented as a blend of Zr—OH (0.05 g/in$^3$) and Zr—N (0.005 g/in$^3$). Acetic acid or acetate precursors were strictly avoided in the top washcoat so as to avoid resolubilization of the Pd and part of the Pt in the bottom and top washcoats. A small amount of tartaric acid was used in the top washcoat to fix precious group metals on the support.

Example 8

HC/CO Light-Off Testing

Washcoat compositions C-F were tested for CO light-off and for HC conversion. The gas composition used for determining light-off temperatures comprised 1500 ppm CO, 100 ppm NO, 14% $O_2$, 4% $CO_2$, 4% $H_2O$ with the balance being $N_2$. The gas also comprised 120 ppm Cl as propene, 80 ppm as toluene, 200 ppm Cl as decane and 30 ppm as methane. The gas was run over washcoat compositions C-G at a temperature ramp of 20° C./min and a space velocity of 55 k/h. HC conversion as a percentage was calculated from the gas exiting the catalyst.

Figure 7:
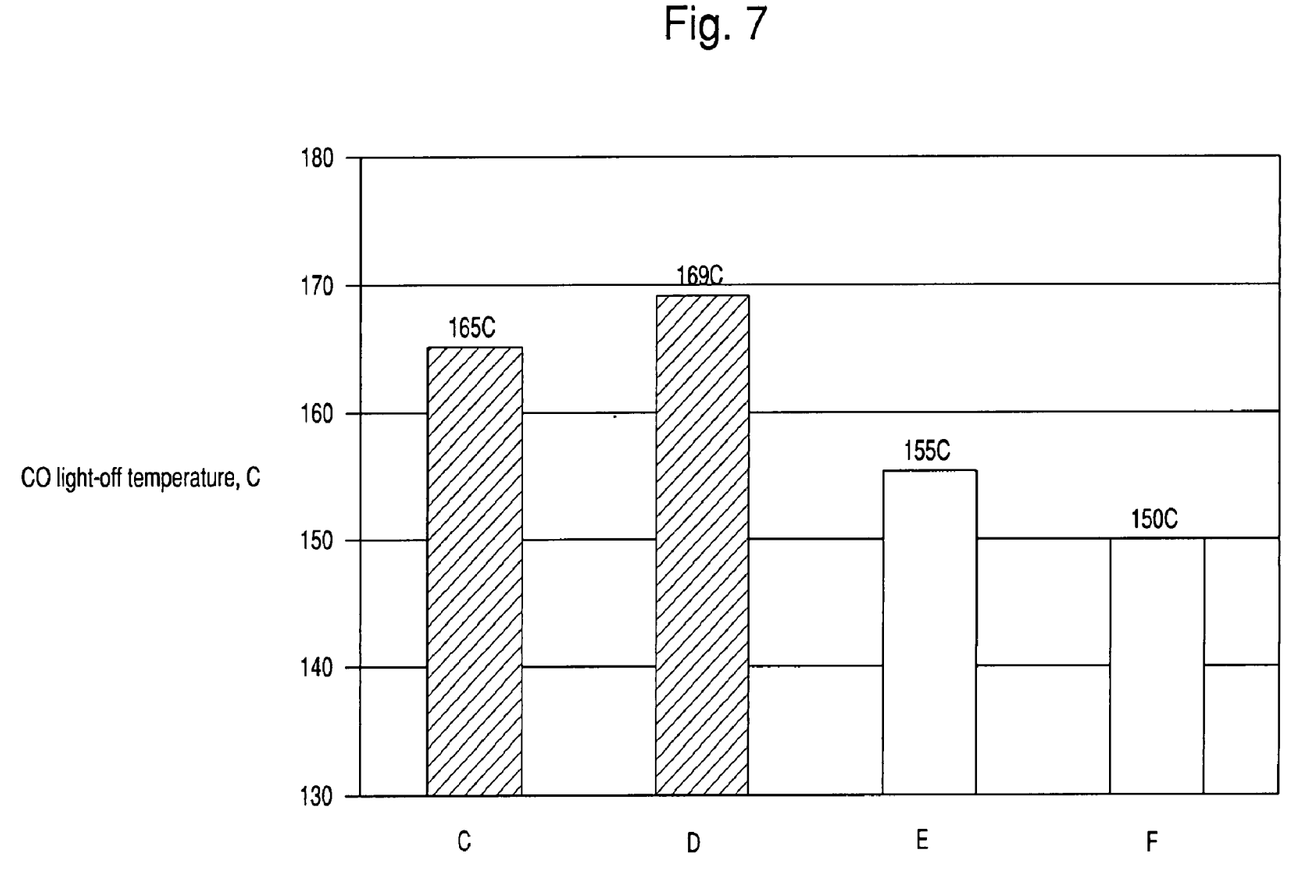
FIG. 7 shows a comparison of CO light-off after 5 hour aging at 800° C. between various washcoat compositions.
Figure 8:
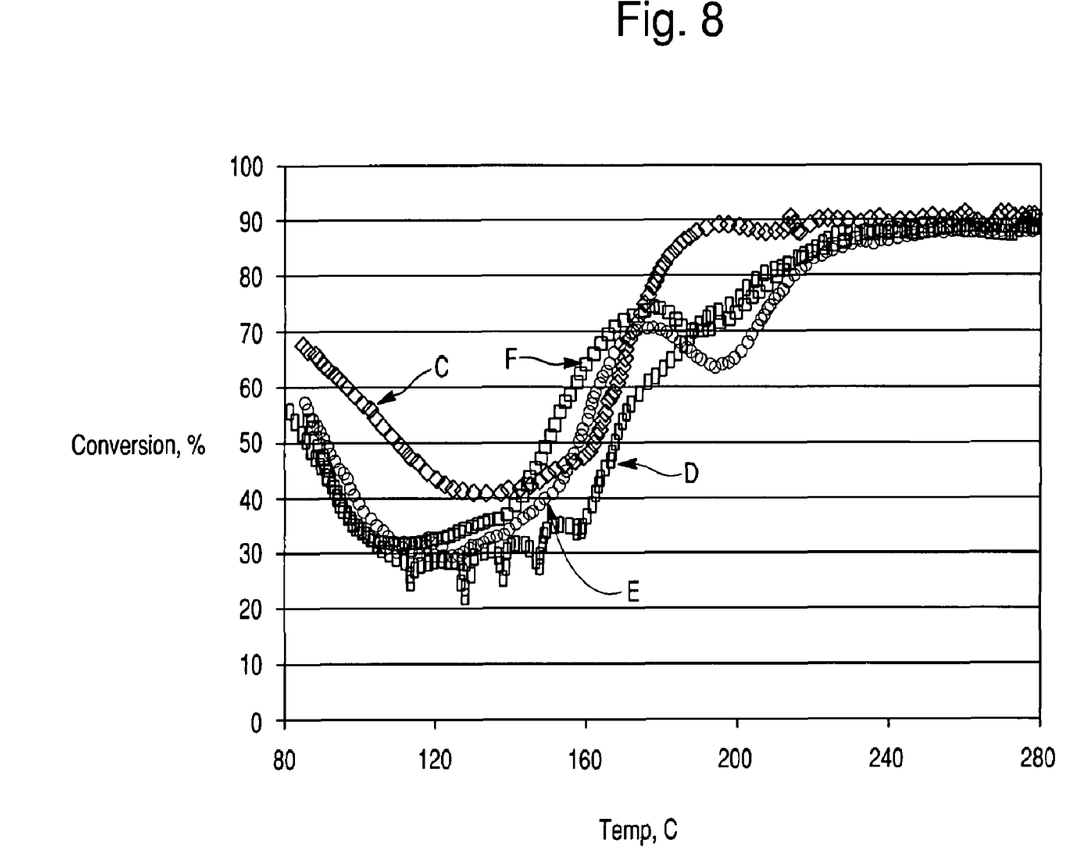
FIG. 8 shows a comparison of HC light-off after 5 hour aging at 800° C. between various washcoat compositions.
Figure 9:
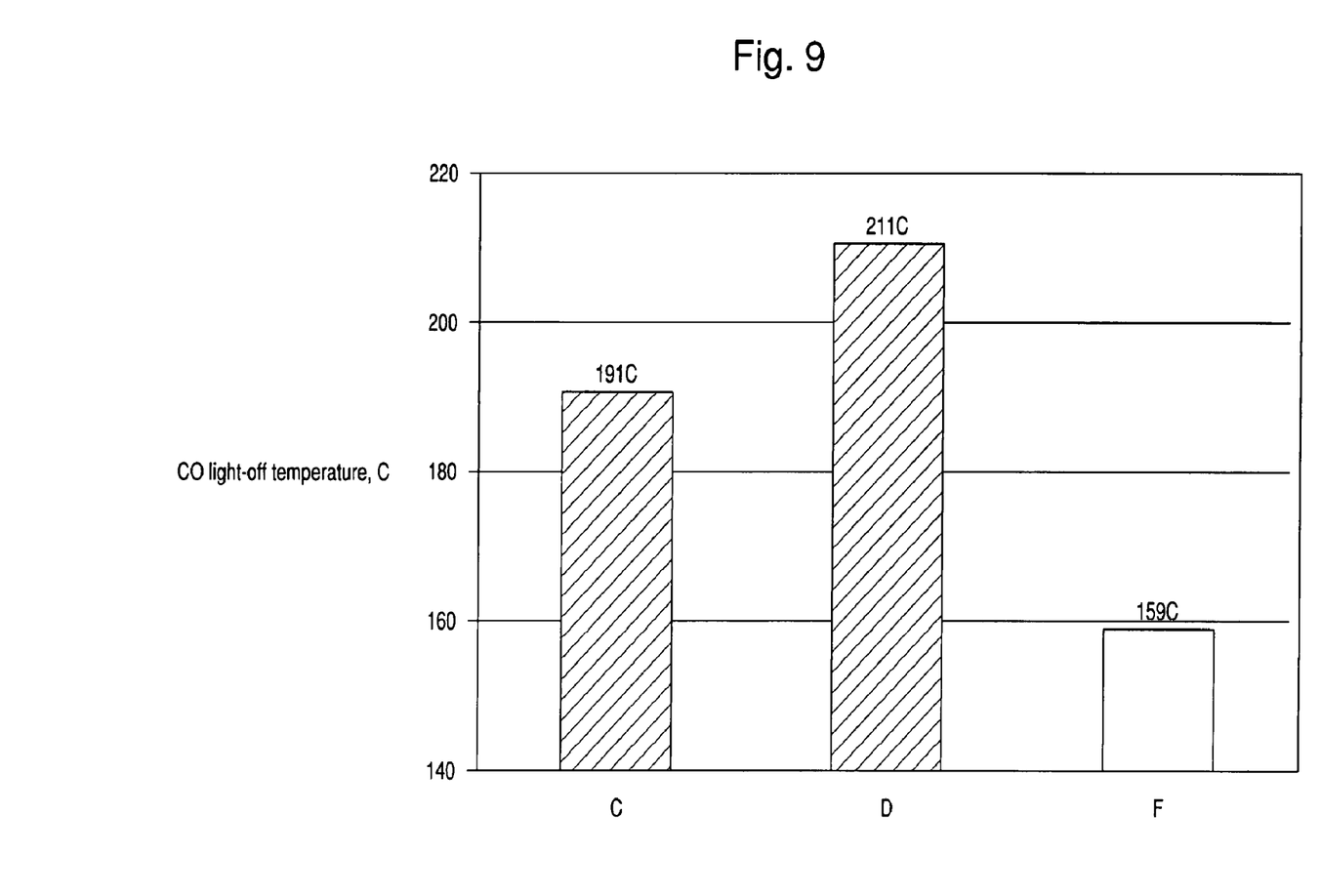
FIG. 9 shows a comparison of CO light-off after 5 hour aging at 900° C. between various washcoat compositions.
Figure 10:
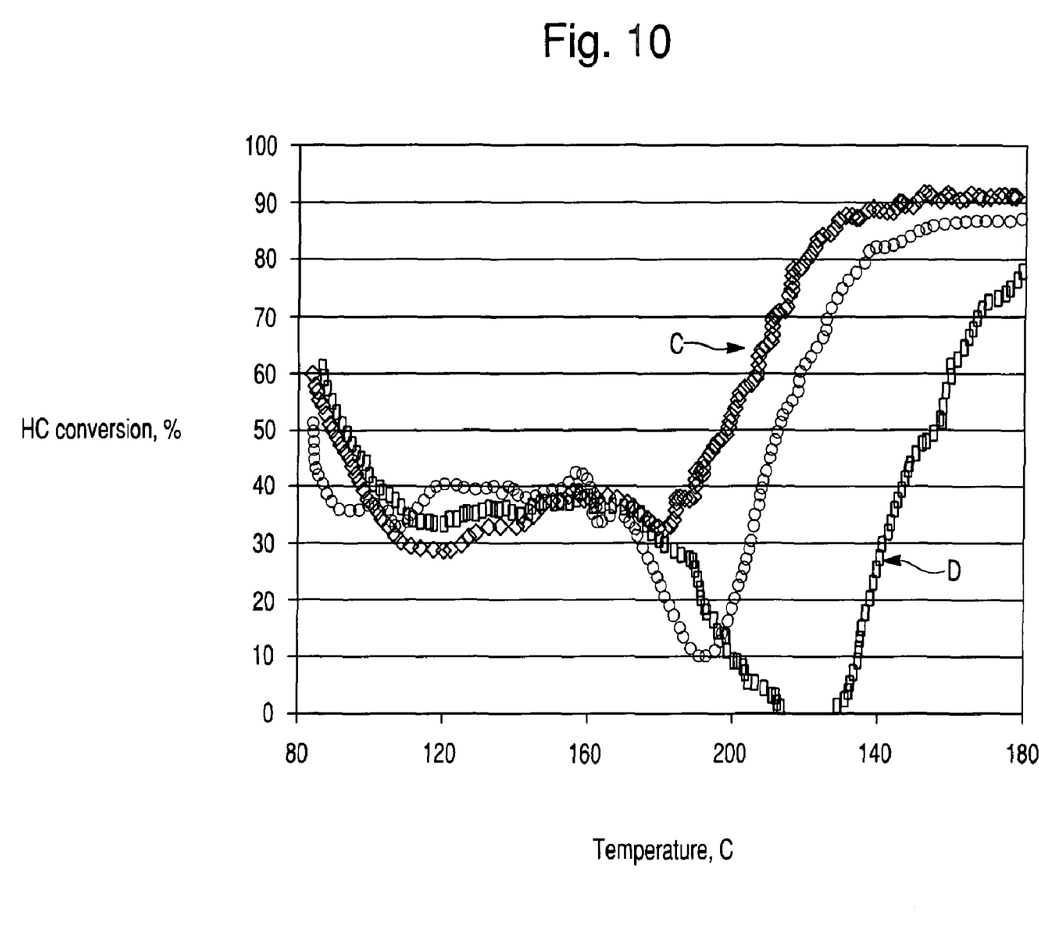
FIG. 10 shows a comparison of HC light-off after 5 hour aging at 900° C. between various washcoat compositions.

HC/CO light-off temperatures were determined for washcoat compositions C-F after aging at 800° C. for 5 hours (FIGS. 7 and 8) and for washcoat compositions C, D and F after aging at 900° C. for 5 hours (FIGS. 9 and 10). As can be seen from the FIGS. 7 and 9, both washcoat compositions E and F, which comprised novel washcoat compositions of the present invention, had lower CO light-off temperatures than either of the comparative washcoat compositions C and D. Furthermore, as can be seen from FIG. 7 washcoat composition F, which contained $La_2O_3$ as a promoter to boost HT-stability in the bottom washcoat layer resulted in a slightly lower CO light-off temperature. As can be seen from FIG. 8 washcoat composition F had a lower HC light-off temperature than comparative washcoat compositions C or D. Washcoat composition E also had a lower light-off temperature than comparative washcoat compositions C and D, but the light-off temperature of E was slightly higher than washcoat composition F. As can be seen from FIG. 10 washcoat composition F, after aging at 900° C. for 5 hours, had a HC light-off temperature lower than comparative Pt/Pd washcoat composition D but higher than comparative Pt washcoat composition C.

Example 9

Calcination and Aging of Washcoat Composition F

The elemental composition of both the top washcoat (TC) and bottom washcoat (BC) of washcoat composition F was determined by XPS (X-ray photoelectron spectroscopy) after calcination and aging for 5 hours at 800° C. Both the Pt and Pd precious metals were present in the BC and TC as oxides after calcination (see Table 1). However, after aging at 800° C. for 5 hours the Pt and Pd had been completely reduced to their metallic states indicating that the more thermally stable Pt—Pd alloy is formed (see Table 1).

After aging the particle size of the BC was determined by X-ray diffraction to be 16.4 nm and the TC was determined to be 21.2 nm reflecting the higher dispersion and stability with the higher Pd ratio.

TABLE 1

BC and TC elemental composition by XPS after calcination and 5 h aging at 800° C.

| | BC (cal) | BC (aged) | TC (cal) | BC (aged) |
|---|---|---|---|---|
| $Pt^0$ | ND | 0.03 | ND | 0.06 |
| $Pt(OH)_4$ | 0.08 | ND | 0.14 | ND |
| $Pd^0$ | ND | 0.09 | ND | 0.14 |
| $Pt^{2+}$ | 0.27 | ND | 0.15 | ND |
| $LaO_x$ | 0.4 | 0.4 | ND | ND |
| $ZrO_2$ | 1.1 | 0.9 | 0.7 | 0.6 |

What is claimed is:

1. An emission treatment system for treating exhaust gas emissions from a diesel engine containing hydrocarbons, carbon monoxide, and particulate matter comprising:
   a diesel oxidation catalyst comprising a carrier substrate comprising a bottom washcoat layer coated on said carrier substrate comprising a high-surface area support material and a precious metal catalyst consisting of platinum (Pt) and palladium (Pd) in a Pt:Pd weight ratio, wherein said support is a substantially silica-free high-surface area support material, and wherein said bottom washcoat layer does not contain a hydrocarbon storage component; a top washcoat layer coated over said bottom washcoat layer comprising a high-surface area support material, one or more hydrocarbon storage components, and a precious metal catalyst consisting of platinum (Pt) and palladium (Pd) in a Pt:Pd weight ratio; and wherein said Pt:Pd weight ratio in said top washcoat layer is from about 2:1 to up to about 4:1 and is greater than said Pt:Pd weight ratio of said bottom washcoat layer;
   a soot filter located downstream from the diesel oxidation catalyst to trap particulate matter from the exhaust gas; and
   a catalyst for the conversion of NOx located downstream from the soot filter.

2. The system of claim 1, wherein said Pt:Pd ratio of said bottom washcoat layer of the diesel oxidation catalyst is from less than about 2:1 to about 1:2.

3. The system of claim 1, wherein said Pt:Pd ratio of said bottom washcoat layer of the diesel oxidation catalyst is 7:5 and said Pt:Pd ratio of said top washcoat layer is 3:1.

4. The system of claim 1, wherein said bottom washcoat and/or top washcoat layer of the diesel oxidation catalyst further comprises zirconium oxide.

5. The system of claim 1, wherein said bottom washcoat layer of the diesel oxidation catalyst further comprises lanthanum oxide.

6. The system of claim 1, wherein said support material of said bottom washcoat layer of the diesel oxidation catalyst is selected from the group consisting of alumina, zirconia, titania and mixtures thereof.

7. The system of claim 1, wherein said support material of said top washcoat layer of the diesel oxidation catalyst is selected from the group consisting of silica, alumina, zirconia, titania and mixtures thereof.

8. The system of claim 1, wherein said hydrocarbon storage component of the diesel oxidation catalyst is a zeolite and said zeolite is selected from the group consisting of faujasite, chabazite, clinoptilolite, mordenite, silicalite, zeolite X, zeolite Y, ultrastable zeolite Y, ZSM zeolite, offretite, and beta zeolite.

9. An emission treatment system for treating exhaust gas emissions from a diesel engine containing hydrocarbons, carbon monoxide, and particulate matter comprising:
   a diesel oxidation catalyst comprising a carrier substrate; an upstream washcoat layer coated over an upstream portion of said carrier substrate comprising a high-surface area support material, one or hydrocarbon storage components, and a precious metal catalyst consisting of platinum (Pt) and palladium (Pd) in a Pt:Pd weight ratio; a downstream washcoat layer zone coated over a downstream portion of said carrier substrate comprising a high-surface area support material and a precious metal catalyst consisting of platinum (Pt) and palladium (Pd) in a Pt:Pd weight ratio, wherein said support is a substantially silica-free high-surface area support material, and wherein said downstream washcoat layer does not contain a hydrocarbon storage component; and wherein said Pt:Pd weight ratio in said upstream washcoat layer is from about 2:1 to up to about 4:1 and is greater than said Pt:Pd weight ratio of said downstream washcoat layer;
   a soot filter located downstream from the diesel oxidation catalyst to trap particulate matter from the exhaust gas; and
   a catalyst for the conversion of NOx located downstream from the soot filter.

10. The system of claim 9, wherein said Pt:Pd ratio of said downstream washcoat layer of the diesel oxidation catalyst is from less than about 2:1 to about 1:2.

11. The system of claim 9, wherein said Pt:Pd ratio of said upstream washcoat layer of the diesel oxidation catalyst is 3:1 and said Pt:Pd ratio of said downstream washcoat layer is 7:5.

12. The system of claim 9, wherein said hydrocarbon storage component of the diesel oxidation catalyst is a zeolite and said zeolite is selected from the group consisting of faujasite, chabazite, clinoptilolite, mordenite, silicalite, zeolite X, zeolite Y, ultrastable zeolite Y, ZSM zeolite, offretite, and beta zeolite.

13. The system of claim 9, wherein said substrate of the diesel oxidation catalyst has an upstream edge and a downstream edge and said top upstream washcoat layer is zone coated over a length from about 5% to about 70% of said substrate from said upstream edge.

14. The system of claim 12, wherein said bottom downstream washcoat layer of the diesel oxidation catalyst is zone coated over a length from about 95% to about 30% of said substrate from said downstream edge.

15. A method for treating a diesel exhaust gas stream containing hydrocarbons, carbon monoxide and particulate matter, the method comprising:

(a) providing a diesel oxidation catalyst comprising:

(i) a carrier substrate having an upstream edge and a downstream edge;

(ii) a bottom washcoat layer coated on said carrier substrate comprising a high-surface area support material and a precious metal catalyst consisting of platinum (Pt) and palladium (Pd) in a Pt:Pd weight ratio, wherein said support is a substantially silica-free high-surface area support material, and wherein said bottom washcoat layer does not contain a hydrocarbon storage component;

(iii) a top washcoat layer coated over said bottom washcoat layer comprising a high-surface area support material, one or hydrocarbon storage components, and a precious metal catalyst consisting of platinum (Pt) and palladium (Pd) in a Pt:Pd weight ratio; and (iv) wherein said Pt:Pd weight ratio in said top washcoat layer is from about 2:1 to up to about 4:1 and is greater than said Pt:Pd weight ratio of said bottom washcoat layer;

(b) contacting said diesel exhaust gas stream with said diesel oxidation catalyst from said upstream edge to said downstream edge for the treatment of exhaust gas emissions so that the oxidation catalyst oxidizes hydrocarbons and carbon monoxide in the exhaust gas to carbon dioxide and water; and (c) conveying the exhaust gas exiting the diesel oxidation catalyst to a downstream soot filter and NOx conversion catalyst.

16. The method of claim 15, wherein said Pt:Pd ratio of said bottom washcoat layer of the diesel oxidation catalyst is 7:5 and said Pt:Pd ratio of said top washcoat layer is 3:1.

17. The method of claim 15, wherein the soot filter comprises a catalyzed soot filter (CSF).

18. The method of claim 17, wherein the NOx conversion catalyst comprises a selective catalytic reduction (SCR) component located downstream of the catalyzed soot filter (CSF).

* * * * *